US008561966B2

(12) United States Patent
Dohi et al.

(10) Patent No.: US 8,561,966 B2
(45) Date of Patent: Oct. 22, 2013

(54) CAM VALVE

(75) Inventors: Ryousuke Dohi, Osaka (JP); Kouji Nishino, Osaka (JP); Nobukazu Ikeda, Osaka (JP); Yohei Sawada, Osaka (JP)

(73) Assignee: Fujikin Incorporated, Osaka (JP)

( * ) Notice: Subject to any disclaimer, the term of this patent is extended or adjusted under 35 U.S.C. 154(b) by 580 days.

(21) Appl. No.: 12/439,572

(22) PCT Filed: Aug. 21, 2007

(86) PCT No.: PCT/JP2007/000891
§ 371 (c)(1),
(2), (4) Date: Mar. 2, 2009

(87) PCT Pub. No.: WO2008/026306
PCT Pub. Date: Mar. 6, 2008

(65) Prior Publication Data
US 2010/0207044 A1 Aug. 19, 2010

(30) Foreign Application Priority Data

Aug. 30, 2006 (JP) .................................. 2006-232906

(51) Int. Cl.
*F16K 31/44* (2006.01)
*F16K 31/02* (2006.01)
(52) U.S. Cl.
USPC ....... 251/254; 251/129.11; 251/257; 251/263
(58) Field of Classification Search
USPC ................ 251/129.11–129.13, 251–263, 331
See application file for complete search history.

(56) References Cited

U.S. PATENT DOCUMENTS 1,635,146 A * 7/1927 Wineman ....................... 251/262
3,656,709 A * 4/1972 Shufflebarger et al. ......... 251/95
(Continued)

FOREIGN PATENT DOCUMENTS

JP 61017779 A 1/1986
JP 61-117971 7/1986
(Continued)

OTHER PUBLICATIONS

Microfilm of the Specification and Drawings Annexed to the Request of Japanese Utility Model Application No. 1042/1985 (Laid Open No. 117972/1986) (Fujikin Inc.), Jul. 25, 1986.

(Continued)

*Primary Examiner* — Len Tran
*Assistant Examiner* — Justin Jonaitis
(74) *Attorney, Agent, or Firm* — Griffin & Szipl, P.C.

(57) ABSTRACT

In a step motor driven cam valve a stem freely ascends and descends within a body having an in-flow passage, an out-flow passage, a valve chamber, and a valve seat. The stem is descended by an actuator, composed of a step motor and a cam mechanism located at a position above the stem, that changes a rotational motion of the step motor to a linear motion and transmits the linear motion to the stem. A diaphragm within a valve chamber or a valve body at a lower end part of the stem rests on the valve seat. A lift support mechanism that supports the actuator to freely ascend and descend is arranged at a bonnet that covers the valve chamber. A height fine-adjustment mechanism, arranged at the lift supporting mechanism, finely adjusts the height of the actuator relative to the stem so as to perform zero-point adjustment of the valve.

6 Claims, 5 Drawing Sheets

(56) References Cited

U.S. PATENT DOCUMENTS 4,770,390 A * 9/1988 Tratz et al. ............... 251/129.11
5,551,477 A * 9/1996 Kanno et al. .................. 137/553
6,443,135 B1 * 9/2002 Dismon et al. ........... 123/568.18

FOREIGN PATENT DOCUMENTS

JP  61-117972  7/1986
JP  2002168361 A * 6/2002
JP  2006112504 A  4/2006

OTHER PUBLICATIONS

International Search Report, issued in corresponding application No. PCT/JP2007/000891, completed Oct. 3, 2007, mailed Oct. 16, 2007.
Machine translation of previously cited JP2002-168361A, publication date of Jun. 14, 2002.

* cited by examiner

CAM VALVE

This is a National Phase Application in the United States of International Patent Application No. PCT/JP2007/00891 filed Aug. 21, 2007, which claims priority on Japanese Patent Application No. 2006-232906, filed Aug. 30, 2006. The entire disclosures of the above patent applications are hereby incorporated by reference.

FIELD OF THE INVENTION

The present invention relates to a step motor driven cam valve disposed between fluid supply lines of primarily either a semiconductor manufacturing facility or a refrigerant circulating circuit of a chiller unit, and used for adjusting the flow rate of a fluid such as gas or refrigerant. In particular, the present invention relates to improvement of a step motor driven valve having a cam mechanism, configured to control minutely and accurately the flow rate of gas and refrigerant.

BACKGROUND OF THE INVENTION

Conventionally, a step motor driven valve having a cam mechanism (hereinafter referred to as a cam valve), has the structure disclosed, for example, in Japanese Published Unexamined Utility Model Application No. S61-117971 (Reference Document 1) and Japanese Published Unexamined Utility Model Application No. S61-117972 (Reference Document 2).

The cam valve is configured to include: a valve box having a fluid passage and valve seat; a valve body that rests on and moves away from the valve seat of the valve box; an elastic body that biases the valve body in a direction away from the valve seat; a valve rod that is coupled to the valve body and is supported to freely ascend and descend to the top lid of the valve box; a cam plate that contacts the cam roller at an upper end of the valve rod to push down the valve rod; and a pulse motor (step motor) that rotates and drives the cam plate. When the cam plate is rotated by the pulse motor to push down on the valve rod, the valve body at the lower end part of the valve rod rests on the valve seat.

This step motor driven cam valve is capable of performing highly accurate flow rate control and exhibits an excellent practical effect.

In the cam valve using the step motor, the cam plate is rotated by a predetermined angle according to the number of pulses supplied to the step motor, and the valve rod and the valve body are minutely deformed by the rotation of the cam plate so as to perform fluid flow rate control. Thus, this valve needs to be zero-point adjusted so that the valve body, the valve rod, etc., are positioned exactly to a zero-point position (a fully opened position or a fully closed position) when fully opening or fully closing the valve.

That is, the valve needs to be adjusted so that when fully opening the valve, a minimum radius portion of the cam plate contacts the cam roller and the valve body and the valve seat are kept furthest apart. On the other hand, when fully closing the valve, the valve needs to be adjusted so that a maximum radius portion of the cam plate contacts the cam roller and the valve body rests on the valve seat with an appropriate force.

Since the aforementioned conventional step motor driven cam valve has no adjusting mechanism for positioning and adjusting the valve body to the zero-point position, it takes a considerable amount of time and effort to zero-point adjust the valve, which is a problem.

Further, unless the processing accuracy and assembly accuracy of each constituent component of the cam valve are increased, the valve body is excessively pressed to the valve seat, or the contact between the valve body and the valve seat is insufficient, resulting in damage to the valve seat and leaking fluid.

[Patent Document 1] Japanese Published Unexamined Utility Model Application No. S61-117971
[Patent Document 2] Japanese Published Unexamined Utility Model Application No. S61-117972

DISCLOSURE OF THE INVENTION

Problem to be Solved by the Invention

The present invention has been achieved in view of the aforementioned problems. An object of the present invention is to provide a step motor driven cam valve capable of fine upward and downward adjustment to a position at which an actuator composed of a step motor and a cam mechanism is supported so that zero-point adjustment of the valve can be performed easily and readily.

Means for Solving the Problem

To achieve the above-described object, the present invention is a step motor driven cam valve characterized in that a stem is disposed to freely ascend and descend within a body having an in-flow passage, an out-flow passage, a valve chamber, and a valve seat. The stem is descended by an actuator composed of a step motor disposed at a position above the stem and a cam mechanism that converts the rotational motion of the step motor into a linear motion and transmits the linear motion to the stem. A diaphragm disposed within the valve chamber or a valve body at the lower end of the stem rests on the valve seat. A lift support mechanism that supports the actuator to freely ascend and descend is arranged at a bonnet that covers the valve chamber and a mechanism for fine adjustment of the height of the actuator for the stem is arranged at the lift support mechanism.

The present invention is also characterized in that the lift support mechanism is composed of: a mounting base arranged at the bonnet; guide axes erected at the mounting base parallel to the stem; a platform attached to the actuator composed of the step motor and the cam mechanism, the platform being supported to freely ascend and descend to the upper end of the guide axes; and a storage case, attached to the upper end of the guide axes, for surrounding the actuator and the platform.

Further, the present invention is characterized in that the mechanism for fine adjustment of the height of the actuator is composed of: an adjusting screw, screwed to move and freely adjust vertically to the bottom of the storage case, of which the upper end surface contacts the lower surface of the platform so as to support the platform; and an elastic body that is disposed between the upper surface of the platform and the ceiling of the storage case. The elastic body presses and biases the platform downward so that the platform contacts the upper end surface of the adjusting screw at all times.

By adjusting the tightening amount of the adjusting screw, the height of the platform attached to the actuator is changed, whereby the height of the actuator for the stem is fine-adjusted.

Effect of the Invention

The cam valve of the present invention is configured so that a lift support mechanism that supports the actuator to freely ascend and descend is composed of a stepping motor and a cam mechanism. The lift support mechanism is arranged at the bonnet of the valve. A mechanism that finely adjusts the height of the actuator for the stem is arranged at the lift support mechanism. Thus, when the mechanism that finely adjusts the height is operated, zero-point adjustment of the valve can be easily and readily performed. As a result, the cam valve of the present invention can eliminate cases where the diaphragm of the valve or the valve body is excessively pressed to the valve seat, or where the contact between the diaphragm or the valve body and the valve seat is insufficient. Thus, damage to the diaphragm, the valve body and the valve seat can be prevented. Leakage of the fluid when the valve is fully closed can also be prevented, thereby reliably and preferably performing highly accurate flow rate control. Further, the exact positioning of the diaphragm, the valve body and the stem to the zero-point position (the fully opened position or the fully closed position) can be adjusted when fully opening or fully closing of the valve even when the processing accuracy and the assembly accuracy of each constituent component of the valve are not improved.

The cam valve of the present invention is also configured such that the guide axes is erected at the mounting base arranged at the bonnet of the valve and the platform attached to the actuator, composed of a step motor and a cam mechanism, is supported to freely ascend and descend the upper end part of the guide axis. As a result, the actuator is kept at a position away from the body. Further, the cam valve of the present invention is configured so that the actuator and the platform are surrounded by a storage case. Consequently, even when the cam valve of the present invention is disposed between fluid supply lines through which high-temperature fluid or low-temperature fluid passes, or refrigerant circulating circuits, the actuator is less adversely affected by the high-temperature fluid or the low-temperature fluid, thereby prolonging the service life, etc., of the actuator.

Further, the cam valve of the present invention is configured such that the mechanism that finely adjusts the height of the actuator is configured by: an adjusting screw, screwed to move and freely adjust vertically at the bottom of the storage case so as to support the platform from the lower-surface; and an elastic body, disposed between the upper surface of the platform and the ceiling of the storage case, for pressing and biasing the platform downward. Thus, the structure of the height fine-adjustment mechanism itself becomes very simple. Furthermore, even when the height fine-adjustment mechanism is at the lift support mechanism, it will not be an obstacle.

DESCRIPTION OF SYMBOLS

The elements discussed in the description and depicted in the figures are represented by the following numerals: cam valve, 2: body, 2a: flow-in passage, 2b: flow-out passage, 2c: valve chamber, 2d: valve seat, 3: diaphragm, 4: presser adaptor, 5: bonnet, 6: bonnet nut, 7: stem, 8: diaphragm presser, 9: stepping motor, 10: cam mechanism, 11: lift supporting mechanism, 12: height fine-adjustment mechanism, 12a adjusting screw, 12b: elastic body, 13: set screw, 14: mounting base, 15: bolt, 16: guide axis, 17: platform, 18: storage case, 30: valve body, and 100: actuator.

BEST MODE FOR CARRYING OUT THE INVENTION

Hereinafter, an embodiment of the present invention will be described in detail with reference to the figures.

Figure 1:
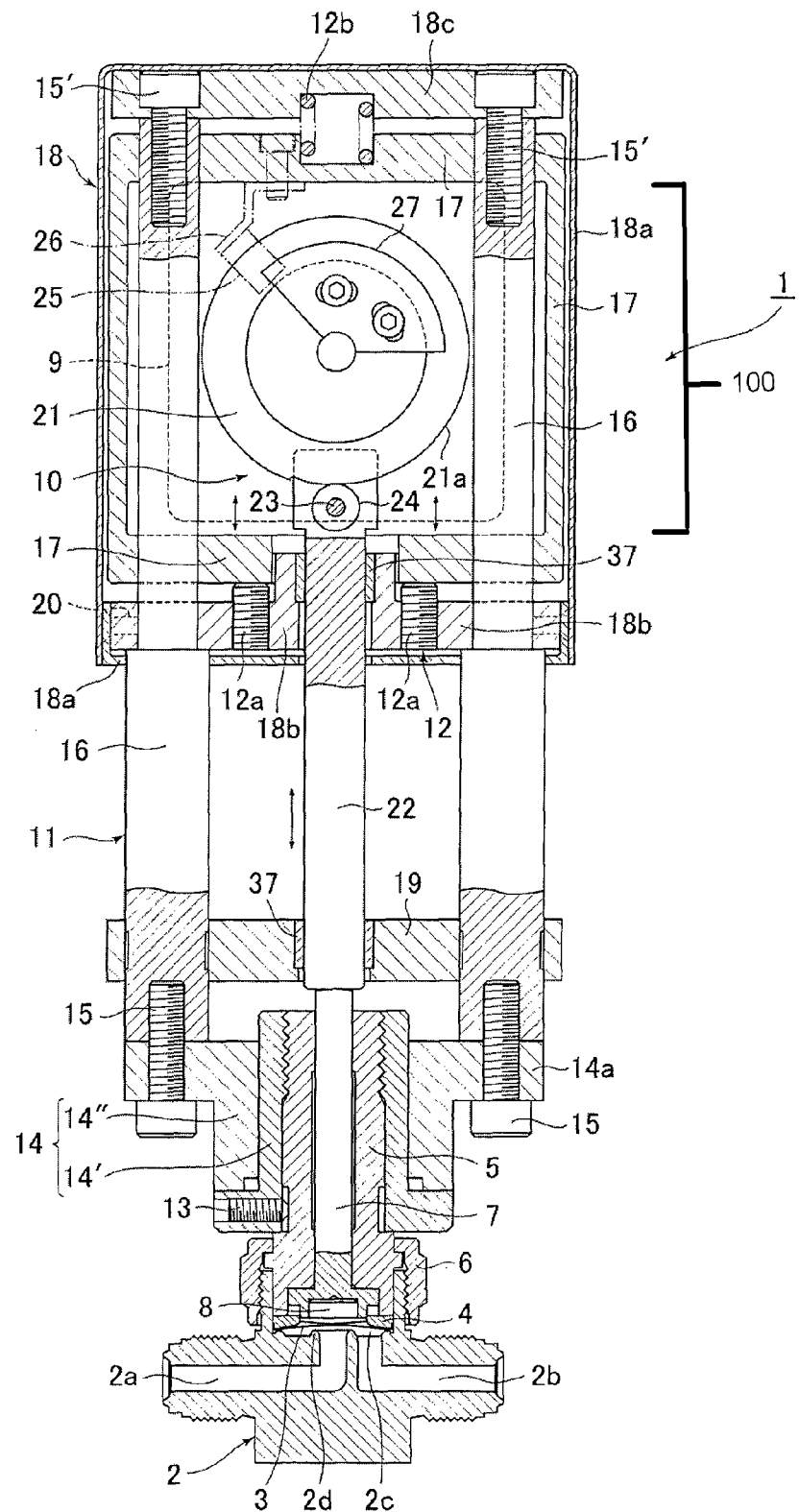
FIG. 1 is a longitudinal front view of a step motor driven cam valve (cam-type diaphragm valve) according to a first embodiment of the present invention.
Figure 2:
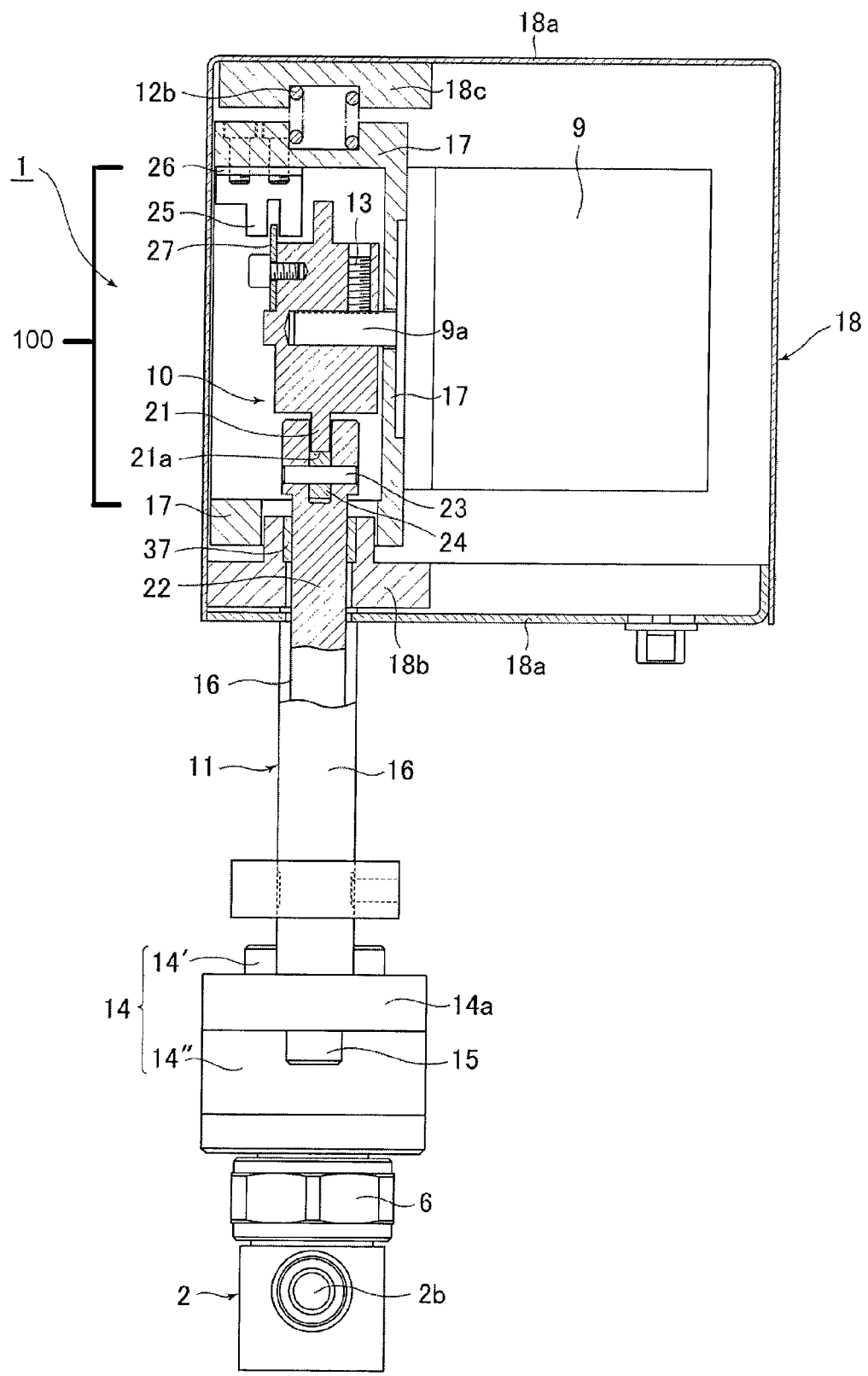
FIG. 2 is a longitudinal sectional side view of the cam valve shown in FIG. 1.

FIG. 1 and FIG. 2 show a step motor driven cam valve 1, according to a first embodiment of the present invention. The cam valve 1 is disposed between branched fluid supply lines each connected to two chambers (twin chamber) of a semiconductor manufacturing device. For example, cam valve 1 may be used as a valve that supplies fluid such as TEOS and $N_2$ to both chambers at the appropriate ratio (5:5 to 4:6, for example). The valve 1 controls a separated flow and is configured as a normal open type diaphragm valve such that a metallic diaphragm directly makes contact with or is moved away from the valve seat 2d so as to open or close the fluid passage.

As shown in FIG. 1 and FIG. 2, the cam valve 1 is configured as follows. The body 2 has an in-flow passage 2a, an out-flow passage 2b, a valve chamber 2c, and a valve seat 2d. The metallic diaphragm 3, keeps the valve chamber 2c airtight. The valve chamber 2c has a top which may be released, i.e. the center part moves vertically and makes contact with or is moved away from the valve seat 2d. An annular presser adaptor 4 is disposed on the upper surface of the outer peripheral part of the diaphragm 3, and a tubular bonnet 5 sandwiches the outer peripheral part of the diaphragm 3 via the presser adaptor 4 between the bonnet 5 and the body 2 in an airtight manner. A bonnet nut 6 fixes the bonnet 5 to the body 2, a stem 7 is disposed within the body 2 and is supported by the bonnet 5 to freely ascend and descend, and a diaphragm presser 8 is arranged at the lower end of the stem 7, for pushing down the center of the diaphragm 3 by contacting the diaphragm 3 when the stem 7 is descending. An actuator 100 is disposed at a position above the stem 7 and is composed of a step motor 9 and a cam mechanism 10 for descending the stem 7. A lift support mechanism 11 is arranged at the bonnet 5, for supporting the actuator 100 to freely ascend and descend. A height fine-adjustment mechanism 12 is arranged at the lift support mechanism 11, for finely adjusting the height position of the actuator 100 relative to the stem 7. The height position of the actuator 100 that drives the stem 7 is changed through fine vertical adjustment by the height fine-adjustment mechanism 12, whereby zero-point adjustment of the valve is performed.

It should be noted that each configuration, other than those of the lift support mechanism 11, the actuator 100, and the height fine-adjustment mechanism 12 of the cam valve 1, is structured similar to that which is conventionally well known. Thus, a detailed description is omitted herein.

The lift support mechanism 11 serves to support the actuator 100 that drives the stem 7 to freely ascend and descend above the stem 7, and is configured as follows. A mounting base 14 includes a flange 14a, formed of a tubular inner member 14' that is screwed to the outer circumferential surface of the bonnet 5 and is fixed to the bonnet 5 by a set screw 13. A tubular outer member 14" is fitted and fixed to the inner member 14'. Right and left guide axes 16 with steps, are erected by a bolt 15 on the upper surface of the flange 14a of the outer member 14″ of the mounting base 14. The upper half of the mounting base 14 is smaller in diameter than the lower half, and is parallel to the stem 7. A box-shaped platform 17 with an open front where the actuator 100 is fitted in, is slidably supported in a vertical direction by the portion of the guide axes 16 that has a smaller diameter. A storage case 18 is attached by bolt 15' to the portions of the right and left guide axes 16 having the smaller diameter, for surrounding the smaller diameter portions of the guide axes 16, the actuator 100, and the platform 17. A brace plate 19 is disposed across the lower end of the both guide axes 16, for slidably inserting and supporting the lower end of cam rod 22 configuring cam mechanism 10 of the actuator 100 in a vertical direction.

The storage case 18 of the lift support mechanism 11 is composed of: a cover plate 18a that is assembled in a box shape; a bottom plate 18b, fixed by a screw 20 to the bottom inner surface of the cover plate 18a so as to face the lower surface of the platform 17, for slidably inserting and supporting the upper end part of the cam rod 22 of the cam mechanism 10 in a vertical direction; and a ceiling plate 18c fixed to the inner ceiling surface of the cover plate 18a so as to face the upper surface of the platform 17.

The actuator 100 is composed of the step motor 9 and the cam mechanism 10, and serves to change the rotational motion of the step motor 9 to a vertical linear motion by the cam mechanism 10 and transmit the motion to the stem 7.

That is, the step motor 9 is stored in a horizontal posture within the storage case 18, and is fixed to the platform 17 so that its output axis 9a forms a posture orthogonal to the stem 7. In this embodiment the step motor 9 is a 2-phase step motor having a basic step angle of 0.9 degrees reaching 0.45 degrees when 1-2 phase excitation is used.

The cam mechanism 10 is composed of: a disc-shaped cam plate 21 which is fixed by the set screw 13 to the output axis 9a of the step motor 9. The outer circumferential surface is cam surface 21a. Cam rod 22 is slidably inserted into and supported by the bottom plate 18b and the brace plate 19 of the storage case 18 vertically via a tubular metal 37, the lower surface of which contacts the upper surface of stem 7. A cam roller 24 (bearing) is supported to rotate freely via pin 23 at the bifurcated upper end part of cam rod 22, and contacts the cam surface 21a of the cam plate 21. When the cam plate 21 is rotated and driven by the step motor 9, the cam surface 21a of the cam plate 21 presses against the cam roller 24 so that the cam rod 22 and the stem 7 that contacts the cam rod 22 descend.

Further, the radius of the cam surface 21a of the cam plate 21 gradually increases from a minimum radius in the range of 0 to 200 degrees to a maximum radius in a range of 200 to 360 degrees, and the radius remains as maximum.

Furthermore, the cam plate 21 is attached to a stopper (not shown) near 230 degrees so that it does not rotate 360 degrees, but rotates back and forth between the origin (0 degrees) and 200 degrees.

As shown in FIG. 1 and FIG. 2, photo sensor 25 is for detecting a fully opened position, and is attached via a bracket 26 to the platform 17. Sensor plate 27 is attached to the cam plate 21, the position of which is detected by the photo sensor 25.

The height fine-adjustment mechanism 12 serves to perform zero-point adjustment of the valve by fine adjustment of the height of the actuator 100. It is composed of: two adjusting screws 12a, screwed into the bottom plate 18b of the storage case 18, which move and adjust freely in a vertical direction. The upper surface of screws 12a contact the lower surface of platform 17 so as to support the platform 17. An elastic body 12b (compression coil spring), disposed between the upper surface of the platform 17 and the ceiling plate 18c of the storage case 18, presses and biases the platform 17 downward so that the platform 17 contacts the upper end surface of the adjusting screw 12a at all times.

The height fine-adjustment mechanism 12, allows the tightening amount of the two adjusting screws 12a to be adjusted such that the minimum radius portion of the cam plate 21 contacts the cam roller 24 to finely adjust the position of the platform 17 attached to the actuator 100 in a vertical direction. In this way, the height position of the actuator 100 is changed so that the lower end surface of the cam rod 22 of the cam mechanism 10 contacts the upper end surface of the stem 7 that is at its highest position. As a result, the zero-point adjustment of the valve can be performed. That is, the valve can be adjusted to a fully opened position.

Then, in the cam valve 1 that has been the zero-point adjusted, while the minimum radius portion of the cam plate 21 contacts the cam roller 24, the stem 7 and the cam rod 22 are in the most ascended state by the elastic force of the diaphragm 3 and the fluid pressure within the body 2, resulting in the fully opened position in which the center part of the diaphragm 3 and the valve seat 2d are furthest apart.

When a predetermined number of pulse input signals are added to the step motor 9 in this state, the step motor 9 performs a stepping rotation according to the number of input pulses, thereby rotating the cam plate 21 by a predetermined angle.

When the cam plate 21 is rotated, the cam roller 24 is pressed downward, and the cam rod 22 and the stem 7 gradually descend against the elastic force of the diaphragm 3 and the fluid pressure within the body 2. The center part of the diaphragm 3 is also gradually pushed downward via the diaphragm presser 8. As a result, the gap between the diaphragm 3 and the valve seat 2d is narrowed, thereby controlling the flow rate of the fluid.

When the center part of the diaphragm 3 is completely pushed down to make contact with the valve seat 2d, the valve is in a fully closed state. As a result, the distribution of fluid is completely blocked.

When the cam plate 21 is rotated in the opposite direction and the minimum radius portion of the cam plate 21 faces the cam roller 24, the diaphragm 3 is restored to its original shape by its elastic force and the fluid pressure within the body 2, and also the stem 7 and the cam rod 22 are pushed upward. As a result, the cam valve 1 is in the fully opened position and the diaphragm 3 and the valve seat 2d are furthest apart.

The cam valve 1 is configured such that the lift support mechanism 11 supports the actuator 100 that drives the stem 7 to freely ascend and descend stem 7, and the lift support mechanism is provided with the height fine-adjustment mechanism 12 composed of the adjusting screws 12a for supporting the platform 17 and the elastic body 12b for pressing and biasing the platform 17 downward. Thus, after the diaphragm 3 rests on the valve seat 2d, the entire platform 17 attached to the actuator 100 ascends so as to compress the elastic body 12b. As a result, in the cam valve 1, the diaphragm 3 will not be excessively pressed to the valve seat 2d, and damage to the diaphragm 3 and the valve seat 2d is prevented. Leakage of the fluid when fully closing the valve can also be reliably prevented. Further, the exact positioning of the diaphragm 3 and the stem 7 to the zero-point position (the fully opened position or the fully closed position) can be adjusted when fully opening (or fully closing) the valve even when the processing accuracy or assembly accuracy of each constituent component of the valve is not improved.

The cam valve 1 is also configured such that the guide axes 16 are erected at the mounting base 14 arranged at the bonnet 5 of the valve so as to support the platform 17 attached to the actuator 100 to the upper end part of the guide axes 16 and allow it to freely ascend and descend. As a result, the actuator 100 is kept apart from the body 2. Further, the actuator 100 and the platform 17 are surrounded by the storage case 18. Consequently, even when the cam valve 1 is disposed between the fluid supply lines through which high-temperature fluid passes, the actuator 100 is less adversely affected by the high-temperature fluid, thereby allowing the service life of the actuator 100 to be prolonged.

Figure 3:
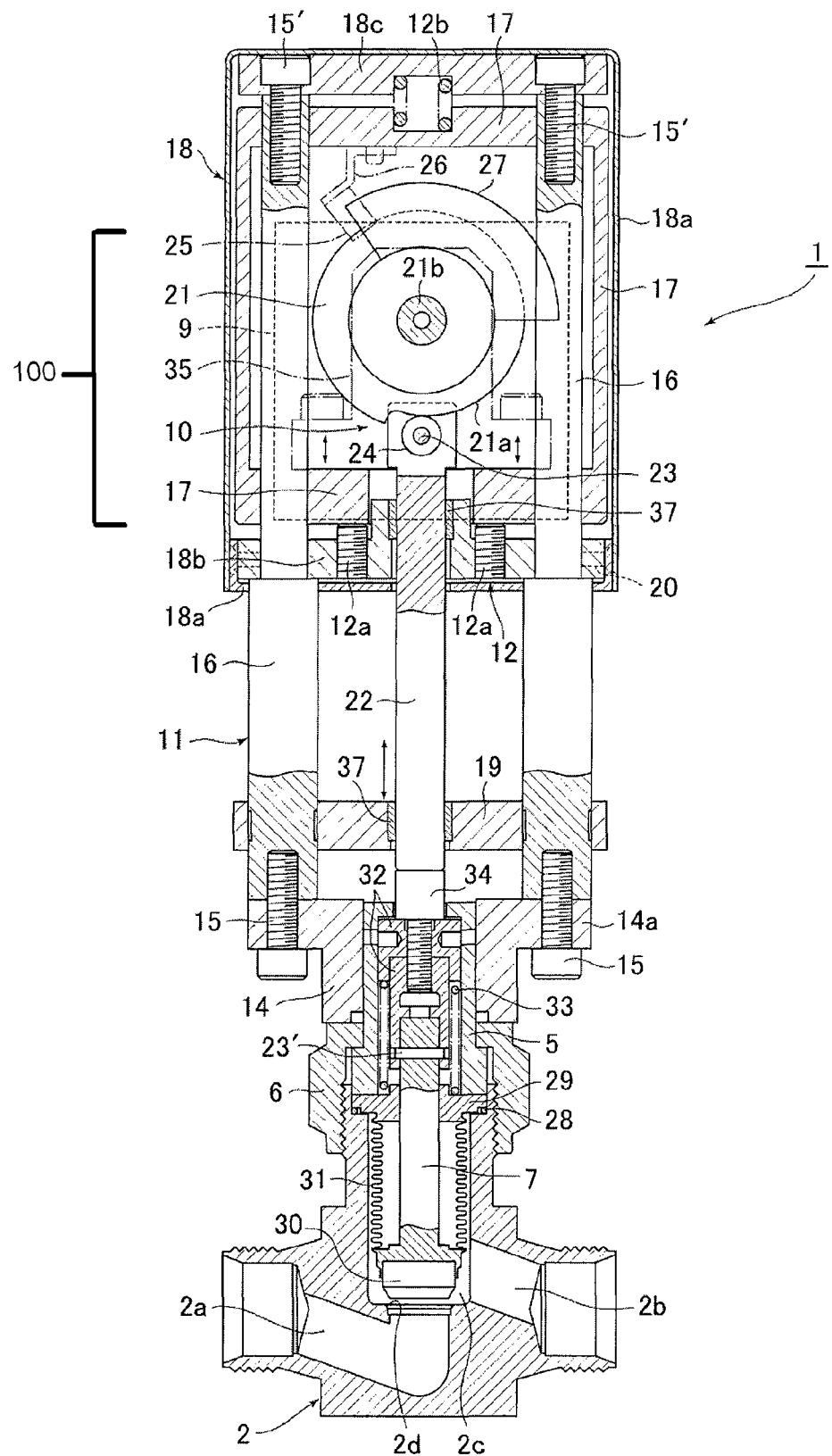
FIG. 3 is a longitudinal front view of a step motor driven cam valve (cam-type bellows valve) according to a second embodiment of the present invention.
Figure 4:
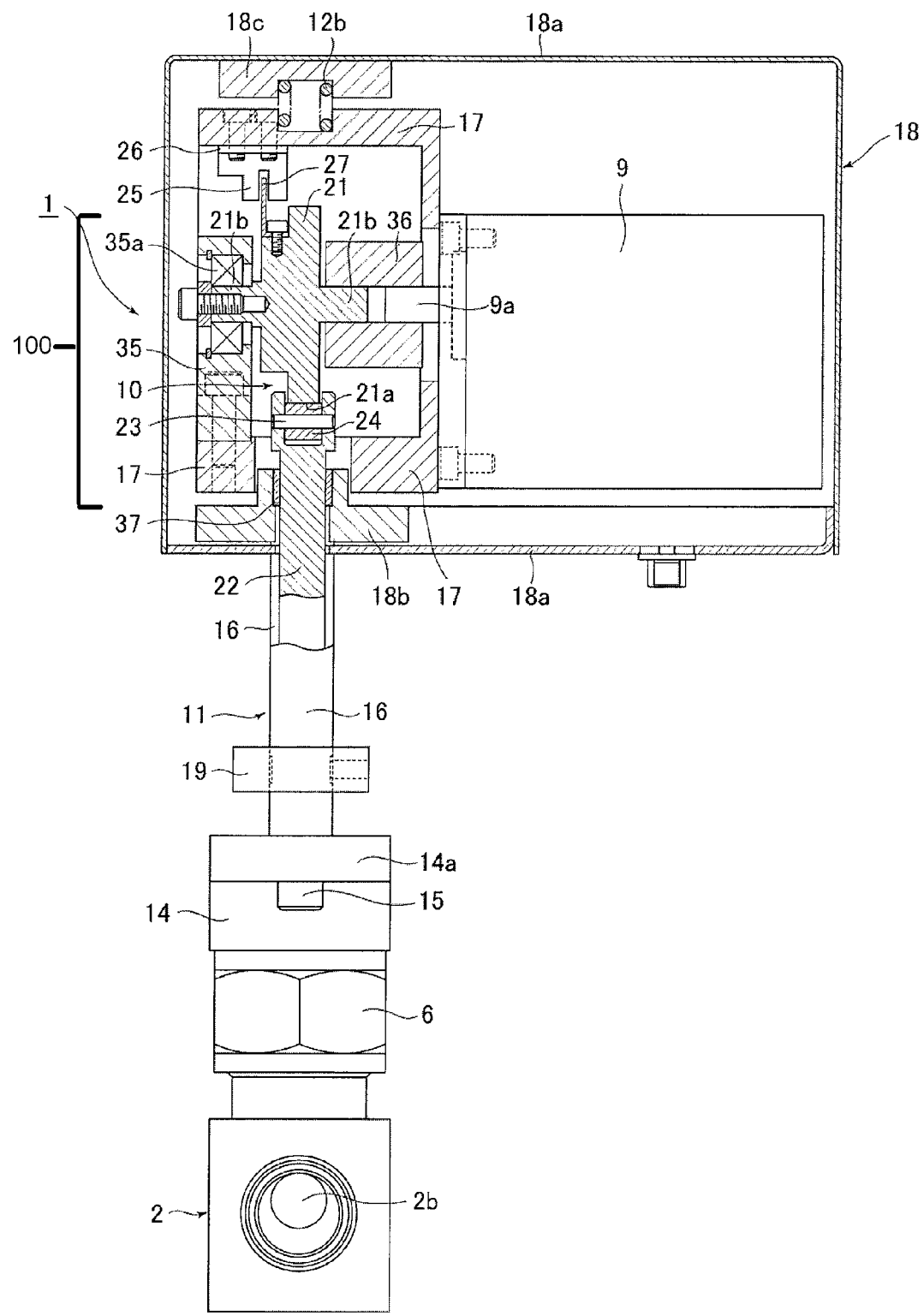
FIG. 4 is a longitudinal sectional side view of the cam valve shown in FIG. 3.

FIG. 3 and FIG. 4 show the step motor driven cam valve 1, according to a second embodiment of the present invention. The cam valve 1 is disposed at respective locations of a chiller unit for heating and cooling a manufacturing device of a semiconductor and a liquid crystal where high-temperature fluid (refrigerant such as hydrofluoroether) in a refrigerant circulating circuit and where low-temperature fluid (refrigerant) in the refrigerant circulating circuit passes. The cam valve 1 is used as the valve for refrigerant control, i.e. for performing flow-rate control of the fluid passing within the refrigerant circulating circuit. Cam valve 1 is configured as a normal open type bellows valve, designed so that the valve body 30 arranged at the lower end of the stem 7 makes contact with or is moved away from the valve seat 2d so as to open or close the fluid passage. Leakage of the fluid is prevented by a metallic bellows 31.

As shown in FIG. 3 and FIG. 4, the cam valve 1 is configured as follows. A body 2 has an in-flow passage 2a, an out-flow passage 2b, a valve chamber 2c, and a valve seat 2d. A bellows flange 29 is disposed at a position above the interior of the valve chamber 2c via a seal member 28. A tubular bonnet 5 sandwiches the outer peripheral part of the bellows flange 29 between the bonnet 5 and the body 2 in an airtight manner. A bonnet nut 6 fixes the bonnet 5 to the body 2, and a stem 7 disposed within the body 2 is slidably inserted to the center of the bellows flange 29. A valve body 30 is arranged at the lower end of the stem 7 and makes contact with or is moved away from the valve seat 2d. A metallic bellows 31 has an upper end that is anchored in an airtight manner to the bellows flange 29 by welding and a lower end that is anchored in an airtight manner to the lower end part of the stem 7 by welding. A holder 32 is attached to the upper end of the stem 7 via a pin 23' that is slidably stored within the bonnet 5 to hold the upper end of the stem 7 within the bonnet 5. A compression coil spring 33 for opening the valve is disposed between the bellows flange 29 and the holder 32, for biasing and holding the stem 7 upward via the holder 32. A tap bolt 34 is screwed to the upper end of the holder 32 and contacts the lower end of the cam rod 22 of cam mechanism 10. An actuator 100 is disposed above the stem 7 and is composed of the cam mechanism 10 and a step motor 9 for descending the stem 7. A lift support mechanism 11 is arranged at the bonnet 5, for supporting the actuator 100 and allowing it to freely ascend and descend, and a height fine-adjustment mechanism 12 is arranged at the lift supporting mechanism 11, for finely adjusting the height position of the actuator 100 relative to the stem 7. The height of the actuator 100 that drives the stem 7 is changed through fine vertical adjustment by the height fine-adjustment mechanism 12, whereby zero-point adjustment of the valve is performed.

It should be noted that configurations of elements other than those of the lift support mechanism 11, the actuator 100, and the height fine-adjusting mechanism 12 are structured similar to that which is conventionally well known. Thus, detailed descriptions are omitted herein.

The lift support mechanism 11 serves to support the actuator 100 that drives the stem 7 at a position above the stem 7 to freely ascend and descend, and is configured by: a tubular mounting base 14 with a flange 14a, fitted and fixed to the outer circumferential surface of the bonnet 5. Right and left guide axes 16 with steps are erected on the upper surface of the flange 14a of the mounting base 14 by bolt 15. The upper half of guide right and left guide axes 16 is made smaller in diameter than the lower half portion, and run parallel to the stem 7. A box-shaped platform 17, having an open front where the actuator 100 is fitted in, is slidably supported vertically by the smaller diameter portions of the guide axes 16. A storage case 18 is attached by a bolt 15' to the smaller diameter portions of the right and left guide axes 16, for surrounding the smaller diameter portions of the guide axes 16, the actuator 100, and the platform 17. A brace plate 19, disposed across the lower end parts of the guide axes 16, allows the lower end part of a cam rod 22 to be slidably inserted and supported, configuring the cam mechanism 10 of the actuator 100 vertically.

The storage case 18 of the lift supporting mechanism 11 includes a cover plate 18a assembled in a box shape, a bottom plate 18b, and a ceiling plate 18c. The bottom plate is fixed by a screw 20 to the bottom inner surface of the cover plate 18a so as to face the lower surface of the platform 17 and is for slidably inserting and supporting the upper end part of the cam rod 22 vertically. Ceiling plate 18c is fixed to a ceiling inner surface of the cover plate 18a so as to face the upper surface of the platform 17.

The actuator 100 is composed of the step motor 9 and the cam mechanism 10, and serves to change the rotational motion of the step motor 9 to a vertical linear motion by the cam mechanism 10 and transmit the linear motion to the stem 7.

That is, the step motor 9 is stored in a horizontal posture within the storage case 18, and is fixed to the platform 17 so that its output axis 9a forms a posture orthogonal to the stem 7. In this embodiment, for the step motor 9, a 2-phase step motor having a basic step angle of 0.25 degrees reaches 0.125 degrees when a 1-2 phase excitation method is used.

The cam mechanism 10 is composed of: a disc-shaped cam plate 21 having an outer circumferential surface, cam surface 21a. Support axis 21b, which protrudes from and is formed on one side surface of cam plate 21 is supported rotatably via a bearing 35a to a bearing stand 35 fixed to the upper surface of the bottom of the platform 17. The support axis 21b which protrudes from and is formed on the other side surface of cam plate 21 is coupled to an output axis 9a of the step motor 9 via a coupling 36. A cam rod 22 is slidably inserted into and supported vertically by the bottom plate 18b and the brace plate 19 of the storage case 18 via a metal tube 37. The, the lower end surface of the cam rod 22 contacts the upper surface of the head of the tap bolt 34. Cam roller 24 (bearing) is supported to rotate freely via a pin 23, located at the bifurcated upper end part of the cam rod 22, and contacts the cam surface 21a of the cam plate 21. When the cam plate 21 is rotated and driven by the step motor 9, the cam surface 21a of the cam plate 21 presses against the cam roller 24 so that the cam rod 22, the tap bolt 34, the holder 32, and the stem 7 descend.

Further, the radius of the cam surface 21a of the cam plate 21 gradually increases from a minimum radius in the range of 0 to 200 degrees, to a maximum radius in a range of 200 to 360 degrees, and the radius remains as maximum.

Further, a stopper (not shown) is attached to the cam plate 21 near 230 degrees so that it does not rotate 360 degrees, rather rotates back and forth between the origin (0 degrees) and 200 degrees.

It should be noted that in FIG. 3 and FIG. 4, reference numeral 25 denotes a photo sensor for detecting a fully opened position. The sensor 25 is attached via a bracket 26 to the platform 17. Reference numeral 27 denotes a sensor plate, attached to the cam plate 21, the position of which is detected by the photo sensor.

The height fine-adjustment mechanism 12 serves to perform zero-point adjustment of the valve by finely adjusting the height of the actuator 100, and is composed of: two adjusting screws 12a and an elastic body 12b (compression coil spring). The adjusting screws 12a are screwed into the bottom plate 18b of the storage case 18 to move and freely adjust vertically. The upper end surface of the screws 12a contacts the lower surface of the platform 17 to support the platform 17. Elastic body 12b (compression coil spring) is disposed between the upper surface of the platform 17 and the ceiling plate 18c of the storage case 18, for pressing and biasing the platform 17 downward so that the platform 17 contacts the upper end surface of the adjusting screw 12a at all times.

The tightening amount of the two adjusting screws 12a of the height fine-adjustment mechanism may be adjusted so that the minimum radius portion of the cam plate 21 contacts the cam roller 24 so as to finely adjust vertically the position of the platform 17 attached to the actuator 100. In this way, the height position of the actuator 100 is changed so that the lower end surface of the cam rod 22 contacts the upper surface of the head of tap bolt 34 that is at the highest position. As a result, the zero-point adjustment of the valve can be performed. That is, the valve can be adjusted to a fully opened position.

Then, in cam valve 1 in which the zero-point adjustment has been performed, while the minimum radius portion of the cam plate 21 contacts the cam roller 24, the stem 7 and the cam rod 22 are in the most ascended state by the elastic force of the compression coil spring 33 for opening a valve, resulting in a fully opened position in which the valve body 30 arranged at the lower end of the stem 7 and the valve seat 2d are kept furthest apart.

When a predetermined number of pulse input signals are added to the step motor 9 in this state, the step motor 9 performs a stepping rotation according to the number of input pulses, thereby rotating the cam plate 21 by a predetermined angle.

When the cam plate 21 is rotated, the cam roller 24 is pressed downward. Thereby, the cam rod 22, the tap bolt 34, the holder 32, and the stem 7 are gradually descended against the elastic force of the compression coil spring 33 for opening a valve. As a result, the gap between the valve body 30 at the lower end of the stem 7 and the valve seat 2d is narrowed, and thus, the flow rate of the fluid is controlled.

When the stem 7 descends to the lowest position so that the valve body 30 arranged at the lower end of the stem 7 rests on the valve seat 2d, the valve is in a fully closed state, which completely blocks the distribution of the fluid.

In this state, when the cam plate 21 is rotated in the opposite direction to cause the minimum radius portion of the cam plate 21 to face the cam roller 24, the stem 7, the cam rod 22, etc., are pushed upward by the elastic force of the compression coil spring 33 for opening a valve. As a result, the cam valve 1 is in a fully opened position in which the valve body 30 arranged at the lower end of the stem 7 is kept furthest apart from the valve seat 2d.

The cam valve 1 is configured such that the lift support mechanism 11 supports the actuator 100 that drives the stem 7 to freely ascend and descend to the stem 7, and the lift support mechanism 11 is provided with height fine-adjustment mechanism 12 composed of adjusting screws 12a for supporting the platform 17 and elastic body 12b for pressing and biasing the platform 17 downward. Thus, after the diaphragm 3 rests on the valve seat 2d, the entire platform 17 attached to the actuator 100 ascends so as to compress the elastic body 12b. As a result, in the cam valve 1, the diaphragm 3 will not be excessively pressed to the valve seat 2d, thus damage to the valve body 30 and the valve seat 2d as well as leakage of the fluid when fully closing the valve can be reliably prevented. Further, the exact positioning of the valve body 30 and the stem 7 to the zero-point position (the fully opened position or the fully closed position) can be adjusted when fully opening (or fully closing) the valve even when the processing accuracy or assembly accuracy of each constituent component of the valve is not improved.

The cam valve 1 is also configured such that the guide axes 16 are erected at the mounting base 14 arranged at the bonnet 5 of the valve. The platform 17 attached to the actuator 100 is supported to freely ascend and descend to the upper end part of the guide axes 16. As a result, the actuator 100 is kept apart from the body 2. Further, the cam valve 1 is configured so that a storage case 18 surrounds the actuator 100 and the platform 17. Consequently, even when the cam valve 1 is disposed between the refrigerant circulating circuits through which refrigerant passes, the actuator 100 is less adversely affected by the refrigerant, thereby prolonging the service life of the actuator 100.

It should be noted that in the step motor driven cam valves 1 (a normal open type diaphragm valve and a normal open type bellows valve) according to the first and second embodiments, during the opening or closing operation of either one of the cam valves 1, the bifurcated upper inner surface of the cam rod 22 and the rotating-portion side surface of the cam roller 24 (rotating-portion side surface of the bearing) are rubbed together, which may generate abrasion powder. The abrasion powder tends to be generated more easily as the number of times of opening or closing the cam valve 1 increases.

In both type of cam valves 1 (diaphragm and bellows), when the axis of the cam plate 21 and that of the cam roller 24 are not parallel, the load of the cam plate 1 is not charged uniformly to the cam roller 24, and the cam rod 22 is likely to rotate along with the rotation of the cam plate 21.

Figure 5:
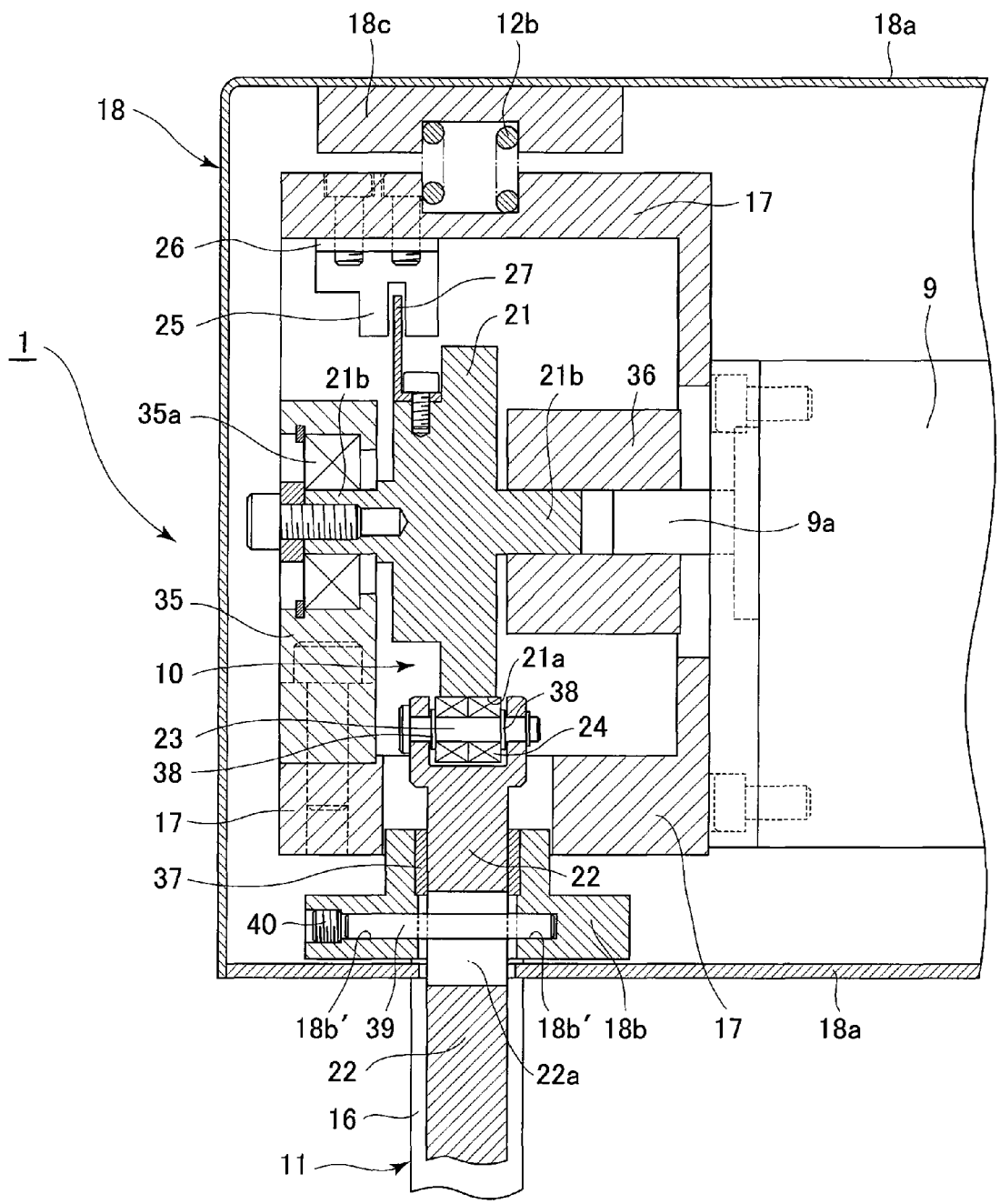
FIG. 5 is a longitudinal sectional side view of essential parts of the cam valve, in which improvement is applied to the step motor drive cam valve (cam-type bellows valve) according to the second embodiment.

The step motor driven cam valve 1 shown in FIG. 5 is that in which the step motor driven cam valve 1 (normal open type bellows valve) according to the second embodiment described above is improved so as to prevent the generation of abrasive powder and rotation of the cam rod 22.

In particular, between the bifurcated upper end inner surface of the cam rod 22 and both side surfaces of the cam roller 24, a gap for allowing the insertion of a washer 38 is formed. The washer 38 is inserted into the gap, and the resultant component is attached to the pin 23, as shown in FIG. 5. As a result, the rubbing between the bifurcated upper inner surface of the cam rod 22 and the rotating-portion side surface (rotating-portion side surface of the bearing) of the cam roller 24 is eliminated. Thus, the generation of abrasion powder produced during the opening or closing of the cam valve 1 can be prevented.

Further, in the cam valve 1, as shown in FIG. 5, a vertically long through-hole 22a parallel to the cam plate 21 and the axis of the cam roller 24 is formed in the cam rod 22. In addition, a fitting hole 18b' facing the through-hole 22a is formed in the bottom plate 18*b* of the storage case 18. A pin 39 that prevents rotation is inserted into the through-hole 22*a*, and the both ends are fitted into the fitting hole 18*b*' of the bottom plate 18*b*. Plug 40 is screwed into the fitting hole 18*b*', which prevents the removal of pin 39. As a result, the cam valve 1 is able to prevent the rotation of the cam rod 22 by pin 39. It should be noted that of course, the outer diameter of pin 39 and the width of through-hole 22*a* are set so that the cam rod 22 can ascend and descend without the rotation of the cam rod 22 during opening and closing of the cam valve 1.

Further, in the cam valve 1, as shown in FIG. 5, the upper surface of the bifurcated upper end of the cam rod 22 is formed to be flush with the upper surface of the outer circumferential surface of cam roller 24, thereby aiming to prevent contact between the cam plate 21 and the cam rod 22.

The cam valve 1 shown in FIG. 5 can provide the actions and effects similar to those of step motor driven cam valves 1 (the normal open type diaphragm valve and the normal open type bellows valve) according to the first and second embodiments as described above. Further, this cam valve 1 is able to prevent the generation of abrasion powder, and the rotation of the cam rod 22.

In the above embodiment, the step motor driven cam valve 1 (normal open type bellows valve) according to the second embodiment is improved to prevent the generation of abrasive powder and rotation of the cam rod 22. In other embodiments, although not illustrated, the improvement similar to that of the cam valve 1 shown in FIG. 5 may be applied to the step motor driven cam valve 1 (normal open type diaphragm valve) according to the described-above first embodiment in order to prevent the generation of the abrasive powder and the rotation of the cam rod 22.

INDUSTRIAL APPLICABILITY

The cam valve 1 according to the present invention is mainly utilized in a fluid supply line or a refrigerant circulating circuit of a chiller unit for a semiconductor manufacturing facility. However, use is not limited to the semiconductor manufacturing facility and can also be in a fluid supply line in various devices in the chemical industry, pharmaceutical industry, food processing industry, etc.

What is claimed is:

1. A step motor driven cam valve comprising:
   a stem disposed to freely ascend and descend within a body having an in-flow passage, an outflow passage, a valve chamber, and a valve seat, wherein the stem is ascended and descended by an actuator comprising a step motor disposed at a position above the steam and a cam mechanism that changes a rotational motion of the step motor to a linear motion and transmits the linear motion to the stem;
   a diaphragm disposed within the valve chamber that rests on the valve seat;
   a lift support mechanism disposed to support the actuator to freely ascend and descend and arranged at a bonnet that covers the valve chamber of the body; and
   a height fine-adjustment mechanism, arranged at the lift support mechanism, that finely adjusts the position of the actuator relative to the stem.

2. The cam valve according to claim 1, wherein the lift support mechanism comprises
   a mounting base arranged at the bonnet;
   guide axes erected at the mounting base parallel to the stem;
   a platform, attached to the actuator composed of the step motor and the cam mechanism, that is supported by the guide axes and ascends and descends to an upper end part of the guide axes; and
   a storage case, attached to the upper end part of the guide axes, that surrounds the actuator and the platform.

3. A step motor driven cam valve comprising:
   a stem disposed to freely ascend and descend within a body having an in-flow passage, an out-flow passage, a valve chamber, and a valve seat, wherein the stem is ascended and descended by an actuator comprising a step motor disposed at a position above the stem and a cam mechanism that changes a rotational motion of the step motor to a linear motion and transmits the linear motion to the stem;
   a diaphragm disposed within the valve chamber that rests on the valve seat;
   a lift support mechanism disposed to support the actuator to ascend and descend and arranged at a bonnet that covers the valve chamber of the body; and
   a height fine-adjustment mechanism, arranged at the lift support mechanism, that finely adjusts the position of the actuator relative to the stem, wherein the height fine-adjustment mechanism comprises
      an adjusting screw, screwed to move and vertically adjust to a bottom of a storage case, wherein an upper end surface of the adjusting screw contacts a lower surface of a platform so as to support the platform; and
      an elastic body, disposed between an upper surface of the platform and a ceiling of the storage case, that presses and biases the platform downward so that the platform contacts the upper end surface of the adjusting screw at all times.

4. A step motor driven cam valve comprising:
   a stem disposed to freely ascend and descend within a body having an in-flow passage, an out-flow passage, a valve chamber, and a valve seat, wherein the stem is ascended and descended by an actuator comprising a step motor disposed at a position above the stem and a cam mechanism that changes a rotational motion of the step motor to a linear motion and transmits the linear motion to the stem;
   a diaphragm disposed within the valve chamber that rests on the valve seat;
   a lift support mechanism disposed to support the actuator to ascend and descend and arranged at a bonnet that covers the valve chamber of the body; and a height fine-adjustment mechanism, arranged at the lift support mechanism, that finely adjusts the position of the actuator relative to the stem,
   wherein the lift support mechanism comprises
      a mounting base arranged at the bonnet;
      guide axes erected at the mounting base parallel to the stem;
      a platform, attached to the actuator and supported by the guide axes, that ascends and descends to an upper end part of the guide axes; and
      a storage case, attached to the upper end part of the guide axes, for surrounding the actuator and the platform,
   wherein the height fine-adjusting mechanism comprises
      an adjusting screw, screwed to move and adjust vertically at a bottom of the storage case, of which an upper end surface contacts a lower surface of the platform so as to support the platform; and
      an elastic body, disposed between an upper surface of the platform and a ceiling of the storage case, that presses and biases the platform downward so that the platform contacts the upper end surface of the adjusting screw at all times, and wherein height of the actuator relative to the stem is finely adjusted by adjusting a tightening amount of the adjusting screw whereby a position of the platform attached to the actuator is changed.

5. A step motor driven cam valve comprising:

a stem reciprocally disposed within a valve body, the valve body having an in-flow passage, an out-flow passage, a valve chamber, and a valve seat, wherein the stem is moved with respect to the valve seat by an actuator comprising a step motor and a cam mechanism that changes a rotational motion of the step motor to a linear motion and transmits the linear motion to the stem;

closure means for selectively engaging and closing the valve seat in response to reciprocal movement of the stem;

a lift support mechanism disposed to support the actuator's reciprocal movement, and arranged on a bonnet that covers the valve chamber of the valve body; and a height fine-adjustment mechanism, arranged at the lift support mechanism, that finely adjusts the position of the actuator relative to the stem.

6. The cam valve according to claim 1, wherein the height fine-adjustment mechanism comprises an adjusting screw, screwed to move and vertically adjust to a bottom of a storage case, wherein an upper end surface of the adjusting screw contacts a lower surface of a platform so as to support the platform.

* * * * *